United States Patent [19]

Norman et al.

[11] Patent Number: 4,771,381
[45] Date of Patent: Sep. 13, 1988

[54] METHOD AND SYSTEM FOR EFFECTING SENSORY EVALUATION OF A SMOKING PRODUCT

[75] Inventors: Alan B. Norman, Clemmons; Thomas A. Perfetti; Harvey H. Gordin, both of Winston-Salem, all of N.C.

[73] Assignee: R. J. Reynolds Tobacco Company, Winston-Salem, N.C.

[21] Appl. No.: 39,894

[22] Filed: Apr. 20, 1987

[51] Int. Cl.$^4$ .................. G01D 21/00; A24F 13/12; A24F 47/00
[52] U.S. Cl. ........................... 364/401; 131/330; 364/400
[58] Field of Search .............. 364/400, 401; 131/330

[56] References Cited

U.S. PATENT DOCUMENTS 4,711,255 12/1987 Syvarth et al. ................. 131/330

OTHER PUBLICATIONS

Roger G. Rawbone, K. Murphy, M. E. Tate and S. J. Kane, The Analysis of Smoking Parameters: Inhalation and Absorption of Tobacco Smoke in Studies of Human Smoking Behavior; Paper Appearing in Smoking Behavior, Edited by Raymond E. Thornton and Published in 1978 by Churchill Livingstone, Edinburgh, London and New York, pp. 171-194.

D. E. Creighton, M. J. Noble and R. T. Whewell, Instruments to Measure, Record and Duplicate Human Smoking Patterns; Paper Appearing in Smoking Behavior, Edited by Raymond E. Thornton and Published in 1978 by Churchill Livingstone, Edinburgh, London and New York, pp. 277-288.

Primary Examiner—Jerry Smith
Assistant Examiner—Stephen M. Baker
Attorney, Agent, or Firm—Herbert J. Bluhm

[57] ABSTRACT

A method and system for effecting sensory evaluation of a smoking product wherein selected smoking parameters are monitored precisely while a smoking product is being smoked ad libitum by a sensory evaluation panelist. The monitored smoking parameters are used to coordinate a sequence of instructions and prompts that is communicated to the sensory evaluation panelist and is designed to elicit sensory ratings from the panelist for the product being smoked. This allows the smoking product to be evaluated with the least possible disruption to the panelist's normal smoking patterns and leads to a better understanding of the smoking characteristics of the product being evaluated.

11 Claims, 2 Drawing Sheets

METHOD AND SYSTEM FOR EFFECTING SENSORY EVALUATION OF A SMOKING PRODUCT

BACKGROUND OF THE INVENTION

This invention relates to the sensory evaluation of smoking products containing a body of smokable material. The invention is especially suited to the evaluation of cigarettes, cigarillos and cigars but it may also be used for evaluating smokable materials which are consumed in pipes and similar devices.

In the development of smoking products intended for commercial production, it is customary to conduct sensory evaluations of such products during their development phase to determine whether or not the products possess those attributes which are desired by the consumers of the products. Among the sensory evaluations utilized are those performed by small panels of judges who are trained to characterize the attribute intensities of the products. Such sensory evaluations, known as descriptive testing, require the judges to apply uniform terms to describe the product and to be thoroughly familiar with sensory evaluation techniques.

Descriptive testing has heretofore involved the monadic evaluation of smoking products which are smoked ad libitum by sensory panelists or judges who then indicate the intensity of one or more sensory attributes using a predesignated range of intensity ratings. Such testing, however, does not compensate for variables introduced by the judges or panelists. For example, smokers who base their evaluation of the intensity of a particular attribute on the first few puffs may reach a different conclusion than smokers who base their evaluation on the last few puffs of a smoking product being evaluated. This variable can be minimized by obtaining intensity ratings for a particular attribute at spaced points along a rod of smokable material. Although the technique of obtaining a plurality of intensity ratings for the same attribute during the smoking provides a more accurate sensory evaluation of the smoking product, that technique does not address certain other variables which may influence the sensory evaluations made.

It is known that consumers of smoking products develop personal styles and habits for smoking such products to derive the most satisfaction from the use of the products. Thus, some smokers may take small puffs of short duration while other smokers may take large puffs of long duration. The frequency of the puffs taken as well as the degree of inhalation of smoke into the lungs may also vary. These and other differences in the way smoking products are used by consumers make it difficult to develop smoking products designed to appeal to the greatest number of smokers. The differences in how a product is smoked can also influence sensory evaluations due to the individual smoking styles of the panelists. Ideally, the evaluation of a smoking product would be performed by a group of panelists having very similar smoking styles with such smoking styles being representative of a substantial segment of the smoking population. This would require assembling groups of panelists whose smoking styles coincide generally with defined groups within the consuming public. It is not very practical to pursue this idealistic goal due to the wide variations in smoking styles found among smokers and the difficulty in defining the characteristics which distinguish groups of smokers by their smoking styles.

Accordingly, there continues to be a need for a sensory evaluation method which is widely applicable to the evaluation of smoking products but which minimizes the influence of variables relating to individual smoking styles of smokers.

SUMMARY OF THE INVENTION

It is a primary object of this invention to provide a sensory evaluation method for smoking products which delivers detailed information on the manner in which a product is smoked while the evaluation of the product is being made by a sensory evaluation panelist.

It is a further object of this invention to provide a sensory evaluation method for smoking products which minimizes interference with the ad libitum smoking of a smoking product by a sensory evaluation panelist.

Another object of this invention is to provide a sensory evaluation method for smoking products which allows objective measures of the smoking process to be related to attribute ratings assigned by a sensory evaluation panelist.

Other objects and advantages of the invention will become apparent from the detailed disclosure which follows.

The present invention is based on the discovery that selected smoking parameters can be monitored precisely while a smoking product is being smoked ad libitum by a sensory evaluation panelist and the monitored parameters can be used to coordinate a sequence of instructions and prompts that is communicated to the sensory evaluation panelist as the product is being smoked by the panelist. This allows the panelist to complete the ad libitum smoking process with the least possible disruption to the panelist's normal smoking patterns and leads, therefore, to a better understanding of the smoking characteristics of the product being evaluated. Thus, the invention provides a means of obtaining specific attribute ratings assigned by a sensory evaluation panelist which are correlated with particular smoking parameters that are determined by that panelist's individual and unique smoking patterns.

A system that can be used for conducting sensory evaluation of a smoking product in accordance with the present invention generally comprises a mouthpiece adapted for contact with the lips of a sensory evaluation panelist and for drawing smoke from a smoking product into the mouth of the panelist, sensing means associated with the mouthpiece for monitoring selected smoking parameters and generating signals corresponding thereto as the product is being smoked, computer means and an associated monitor with display screen for processing the signals generated by said sensing means and for communicating a sequence of instructions and prompts to the sensory evaluation panelist, a computer program for coordinating the sequence of instructions and prompts communicated to the panelist with the smoking process as determined by the smoking parameters being monitored by the sensing means and means for receiving a sensory evaluation rating from the panelist in response to the sequence of instructions and prompts communicated to the panelist.

By information entered into the computer program, the present system can be designed to communicate instructions and prompts to the panelist only after certain events have occurred in the smoking process as determined by the sensing means and computer which measure and store information on selected smoking parameters as the smoking process proceeds. Thus, the present invention also provides a method for effecting sensory evaluation of a smoking product as the product is being smoked ad libitum by a sensory evaluation panelist. This method includes the steps of (a) monitoring selected smoking parameters by sensing means placed in communication with a mouthpiece through which smoke from the smoking product is drawn into the mouth of a sensory evaluation panelist, (b) communicating a sequence of instructions and prompts to the sensory evaluation panelist as the smoking product is being smoked by the panelist, (c) coordinating the sequence of instructions and prompts to the panelist with the ad libitum smoking process as monitored by the sensing means and (d) receiving a sensory evaluation rating from the panelist in response to the sequence of instructions and prompts communicated to the panelist.

DETAILED DESCRIPTION OF THE PREFERRED EMBODIMENT

Figure 1:
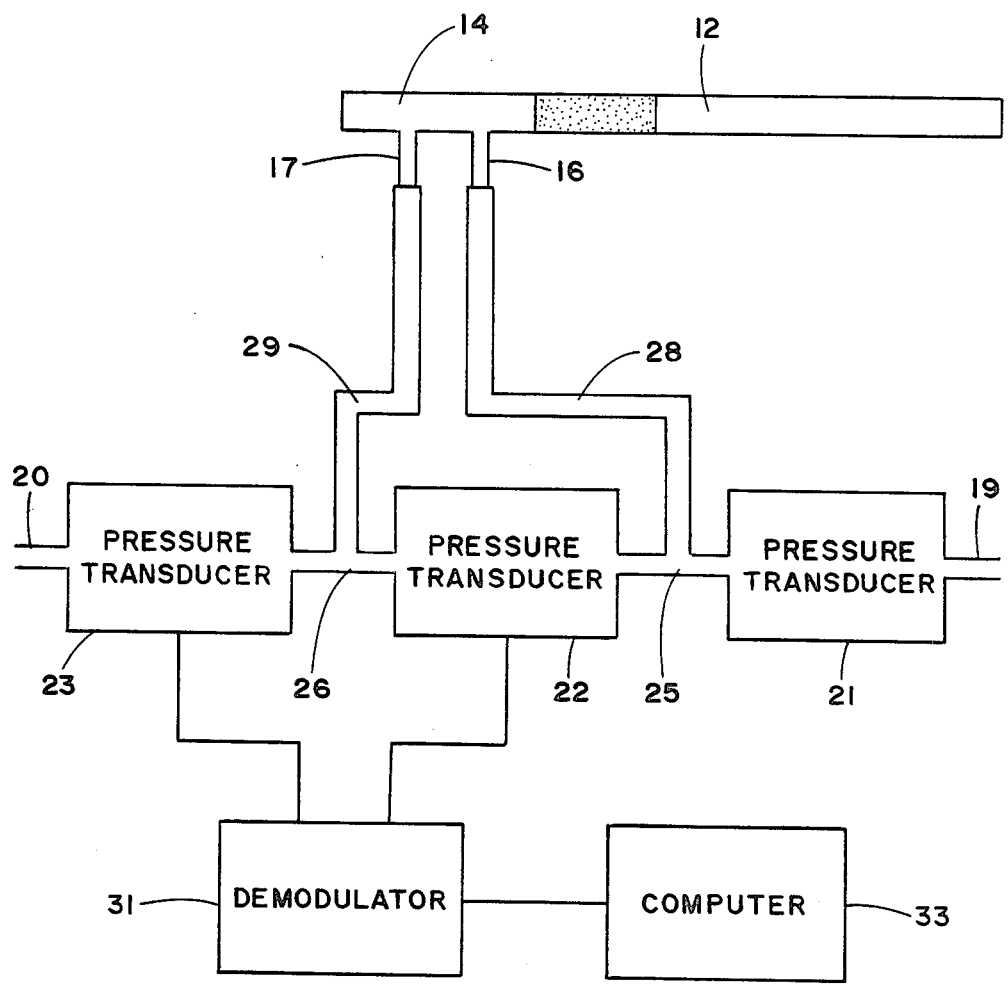
FIG. 1 depicts a typical arrangement for monitoring selected smoking parameters as a smoking product is being smoked.

This invention provides a means for analyzing the smoking characteristics of a smoking product based on evaluations made by sensory evaluation panelists who are allowed to smoke the product as they wish in order to derive the most satisfaction from their use of the product. The only constraints placed on the smoking process are occasional instructions and prompts interjected during the smoking process to obtain attribute ratings and/or other information from the panelists. The instructions and prompts are interjected at points which are determined by the smoking process. The panelists are given no advance warning as to when the instructions and prompts will be presented in order to minimize influencing the smoking process due to panelists' aniticipation of instructions and prompts. Thus, an evaluation of a smoking product can be achieved with this invention under smoking conditions that approximate those under which consumers of smoking products normally smoke.

In order to monitor the smoking process as a smoking product is being evaluated by a sensory evaluation panelist, it is necessary to measure and record certain smoking parameters. Those parameters which are usually determined include puff volume, puff duration, number of puffs, interval between puffs, frequency of puffing and the inhalation pattern. Accurate measurements of the puff parameters can be made by techniques known in the art which are based on measurements of the pressure drop across a small resistance interposed between the smoking product and the mouth of the smoker. A mouthpiece of holder and associated apparatus which can be used for making such pressure drop measurements is described, for example, in SMOKING BEHAVIOR edited by Raymond E. Thornton and published in 1978 by Churchill Livingstone (Edinburgh, London and New York), pages 277–288. The teachings of that publication are incorporated herein by reference. Techniques other than pressure drop measurements across a restriction orifice placed in the path of the smoke may also be used to monitor the smoking process. For example, a temperature sensor positioned in the mouthpiece or holder can be employed to detect temperature changes which indicate the flow of smoke during puffs taken by the smoker. Alternatively, a mouthpiece or holder containing no flow restriction orifice but having a connection port for monitoring pressure fluctuations in the smoke passageway with respect to atmospheric pressure may also be used to monitor puffs being taken by the smoker. The puff parameters derived from such monitoring techniques are preferably processed by computer means programmed to coordinate the communication of instructions and prompts to a sensory evaluation panelist with the smoking parameters as monitored by the selected sensor and associated apparatus.

The computer program used in the practice of this invention may take a variety of forms depending on the results desired. The computer program should be designed to facilitate the introduction of changes into the sensory evaluation format selected by the sensory evaluation analyst. In evaluating a particular smoking product, the computer may be programmed to communicate certain instructions or prompts when predetermined conditions relating to the smoking parameters have been met. For example, a sensory evaluation panelist may be requested to rate menthol flavor after a total smoke volume of 150 cubic centimeters has been drawn from the smoking product as measured by the sensing apparatus. Alternatively, the panelist may be asked to rate menthol flavor after two puffs of at least 30 cubic centimeters each have been taken. Other attributes may be rated in a similar manner with the communication of instructions and prompts to the panelist being triggered by certain events occurring during the smoking process. The techniques for programming computers to perform operations as described herein are well known to those skilled in the computer arts so that further elaboration of such techniques is unnecessary for an understanding of the presently disclosed invention.

The computer means used in the preferred embodiment of this invention includes a monitor with a display screen for visually communicating the various instructions and prompts to the sensory evaluation panelist. The computer is also provided with means for receiving responses from the panelist via suitable devices such as a bit pad with stylus, a keyboard for moving a cursor on the monitor display screen and a touch-sensitive display screen. The touch-sensitive screen is particularly preferred due to the ease with which the panelist may enter a response by moving a finger or other activating means into contact with or close proximity to a specific portion or area of the display screen. The speed and ease with which a response from the panelist can be entered is an important aspect of the evaluation process because it minimizes the unavoidable momentary disruption of the ad libitum smoking process. Panelists are usually asked to refrain from taking a further puff until an appropriate response to an instruction or prompt has been entered by the panelist. It is desirable, therefore, to communicate only such instructions and prompts as are necessary to obtain the desired data for the sensory evaluation being made.

For a better understanding of the present invention, reference will now be made to the accompanying drawings.

FIG. 1 shows a filter cigarette 12 mounted in one end of a mouthpiece or holder 14 with the opposite end being adapted for contact with the lips of a sensory evaluation panelist. The wall of mouthpiece 14 is provided with connector tubes 16 and 17 spaced a short distance apart and which are in communication with the internal passageway of mouthpiece 14. A disc with orifice means formed therein is transversely positioned in the internal passageway of mouthpiece 14 at a point intermediate between the points where connector tubes 16 and 17 are attached. Transducers 21, 22 and 23 are connected in series by tubes 25 and 26 which are in pneumatic communication with connector tubes 16 and 17, respectively, via flexible conduits 28 and 29. The remaining inlets 19 and 20 of transducers 21 and 23 are open to the atmosphere. Transducer 21 acts as a "dummy" transducer and contributes stability to the operation of the transducer arrangement. The output voltages from transducers 22 and 23 are transmitted to demodulator 31 where they are processed and sent as a composite signal to computer 33. Mouthpiece 14 may assume different forms such as a one piece unit as depicted in FIG. 1 or as a pressure drop sensor with detachable paper tubes for completing the passageway between the smoking product and the smoker's lips.

Figure 2:
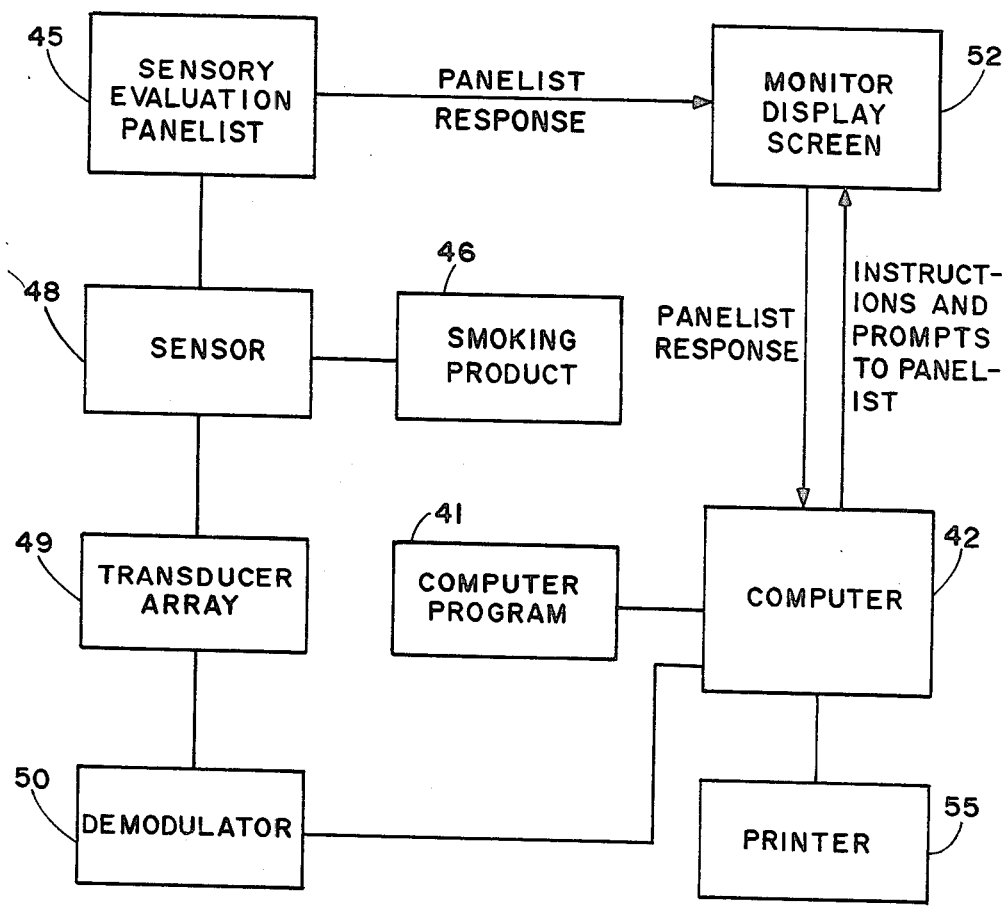
FIG. 2 presents a diagrammatic representation of a system for effecting sensory evaluation of a smoking product in accordance with the present invention.

Shown in FIG. 2 is a schematic representation of a system for conducting sensory evaluation of a smoking product in accordance with this invention. An appropriate computer program 41 is entered into computer 42 for effecting sensory evaluation of smoking product 46. Sensory evaluation panelist 45 is given smoking product 46 with pressure drop sensor 48 affixed thereto. The pressure drop signals from sensor 48 are converted by transducer array 49 and demodulator 50 into a composite signal reflecting specific smoking parameters that is transmitted to computer 42 for processing in accordance with the routines specified by the computer program. At particular points during the ad libitum smoking of product 46, computer 42 communicates certain instructions and prompts to panelist 45 via monitor display screen 52 as certain smoking parameter signals are processed by computer 42. Sensory evaluation panelist 45 enters on monitor display screen 52 a response to the instructions and prompts communicated to the panelist by computer 42. This response is stored by computer 42 along with other responses made by panelist 45 during the smoking of product 46. This procedure is repeated for other sensory evaluation panelists who are participating in the evaluation of product 46. Computer 42 may be programmed to process further the smoking parameter data and the panelist responses correlated therewith for display on the monitor screen or, alternatively, for hard copy produced by printer 55. The computer program may also be designed to manipulate the processed data in various ways in order to facilitate analysis of the smoking and sensory data.

Typical components which have been found to be useful in the arrangement shown in FIG. 1 include a cylindrically-shaped sensor probe fabricated from low density polyethylene with an internal smoke passageway extending through the body of the probe, an orifice plate disposed in the passageway and an array of three Validyne DP-15 differential pressure transducers arranged so that one transducer monitors the pressure differential between atmosphere and the internal smoke passageway on the mouthend side of the orifice plate. A second transducer monitors the pressure differential across the orifice plate and the third transducer serves as "ballast" to stabilize the signals from the two signal-producing transducers. The sensor probe is connected to the transducer array by means of 1/16 inch (outside diameter) polyethylene hose and the two signal-producing transducers are connected to a Validyne model MC1-10-1924 demodulator (available from Validyne Engineering Corporation of Northridge, Calif.) capable of producing up to a 10 volt positive or negative signal that is proportional to each pressure differential being monitored. The analog voltage outputs from the demodulator are connected to analog-to-digital circuits of a Hewlett-Packard HP-2240 measurement and control processor which, in turn, is interfaced with a Hewlett-Packard HP-1000 computer system. The transducer array is calibrated so that a voltage produced at either of the signal-producing transducers can be related to a known pressure differential measured by a water manometer. The calibrations relating to the signals derived from each of the two signal-producing transducers are performed separately so that smoke flow rates can be computed from a predetermined relationship between smoke flow and the two pressure differentials being monitored.

A computer program written in the FORTRAN language is suitable for programming the HP-1000 computer system to process the digitized voltage information received from the HP-2240 measurement and control processor. In this manner the computer can be programmed to monitor the voltage signals at specified intervals (for example, 40 milliseconds) until the signal derived from the "mouthend" transducer exceeds a preset threshold level (for example, 0.015 volts above "baseline"). As the threshold signal level is exceeded it is presumed that the smoker is taking a puff and the subsequent signals from the two signal-producing transducers are stored for processing. As the puff is completed and the signal from the "mouthend" transducer falls below the threshold level, storage of the monitored signals is halted until evidence of a further puff is detected via the monitored signal voltage. This procedure is repeated for each detected puff taken by the sensory evaluation panelist. The stored data for each smoking product smoked by a panelist are then processed by the programmed computer to determine the desired smoking parameters such as duration of puff, interval between puffs, puff volume and average system pressure differential at the mouthend of the sensor probe. The puff volume is determined by converting the signal voltage data to flow rates and numerically integrating the flow rates as a function of time to obtain puff volume. The average system pressure differential is computed by integrating the pressure differential values detected at the mouthend of the sensor probe. The smoking parameters determined are then utilized in a separate program routine that deals with sensory evaluation ratings elicited from the panelists. This separate program routine is modified in accordance with the wishes of the sensory evaluation analyst to ensure that the sensory evaluation ratings are obtained after certain criteria have been met. The separate program routine generates instructions and prompts to the panelist on the display screen of the monitor associated with the HP-1000 computer system. The display includes a line scale with equally spaced divisions and the computer system includes means for moving a cursor to a point on the line scale indicating the panelist's intensity rating of a particular sensory attribute and for signalling the computer to accept the rating entered. The panelist is asked to refrain from taking further puffs until the requested intensity rating or other information has been entered by the panelist and accepted by the computer system.

Using the system described above, a standard full-flavor cigarette was evaluated by nine expert smokers who were requested to follow instructions as they appeared on the display screen of the monitor. The first instruction appearing asked the smoker to light the cigarette and to wait for further instructions. The second instruction was programmed to occur 30 seconds after the first lighting puff was detected by the flow sensor system and consisted of a prompt to smoke the cigarette as desired. After the detection of each puff, the computer was programmed to display a first ballot asking the smoker to rate the strength of the puff just taken on a scale from 0 to 60 which was also displayed on the screen. Although the displayed scale reflected only minimum (0) and maximum (60) markings, the computer recognized 61 discrete positions on the scale. After the rating was entered and accepted by the computer, a second ballot was displayed asking the smoker to rate the tobacco taste of the puff just taken on a scale of 0 to 60. Following entry and acceptance of the smoker's intensity ratings for the two attributes, the smoker was instructed to puff as desired. This cycle of events continued until the smoker completed the smoking process. At this point the sensory evaluation analyst intervened to stop the computer program and to reset the system for the next smoker. In order to obtain a representative assessment of each panelist's ratings for the specified attributes, a total of five cigarettes from the test batch of cigarettes was smoked by eight of the panelists on five consecutive days. The data obtained from the nine smokers were then analyzed by averaging the measured puff volumes and pressure drops as well as the number of puffs for each smoked cigarette to obtain per-cigarette values for each smoker. The average values calculated for each of the five cigarettes smoked by each panelist were then averaged to reflect an average value based on five replications (three replications for panelist No. 5). The data for the attribute ratings by each panelist were averaged in the same manner. The results of the smoking evaluations by the nine panelists are shown in Table 1 and they indicate the fluctuations inherent between the individual panelists in measured puffing behavior and sensory attribute ratings.

TABLE 1

| Panelist | Puff Volume (ml) | Pressure Drop (mm H₂O) | No. of Puffs | Strength (0 to 60) | Tobacco Taste (0 to 60) | No. of Replications |
|---|---|---|---|---|---|---|
| 1 | 33.8 | 297.9 | 15.2 | 41.7 | 39.2 | 5 |
| 2 | 63.3 | 589.2 | 5.6 | 37.6 | 35.4 | 5 |
| 3 | 56.9 | 587.6 | 12.2 | 39.9 | 39.5 | 5 |
| 4 | 47.0 | 441.6 | 9.8 | 19.1 | 18.2 | 5 |
| 5 | 83.4 | 844.8 | 5.3 | 31.3 | 35.4 | 3 |
| 6 | 37.3 | 344.6 | 8.4 | 40.3 | 34.1 | 5 |
| 7 | 53.7 | 538.4 | 7.2 | 39.1 | 44.7 | 5 |
| 8 | 23.5 | 215.4 | 13.4 | 26.8 | 21.6 | 5 |
| 9 | 51.9 | 563.4 | 8.8 | 41.7 | 38.9 | 5 |

The collected data were also subjected to another analysis in which the data were normalized with respect to the total time each cigarette was smoked. The total smoking time used by each individual was divided into five equal time intervals. The measured puff volumes and attribute ratings within each time interval were averaged and the results thus obtained were averaged across individuals to obtain averages on a "by-interval" basis. The results shown in Table 2 clearly indicate a trend toward smaller puff volumes as smoking time increases. Also, the perceived strength and tobacco taste increase during the smoking process but decrease significantly during the last stages of the smoking process.

TABLE 2

| Time Increment | Puff Volume | Strength | Tobacco Taste |
|---|---|---|---|
| 1 | 51.5 | 29.7 | 30.2 |
| 2 | 47.9 | 31.8 | 31.8 |
| 3 | 44.8 | 33.2 | 32.0 |
| 4 | 41.8 | 33.8 | 32.0 |
| 5 | 35.8 | 32.4 | 29.8 |

The methods of analysis described above are intended to be illustrative. Additional analyses could be done depending on the type of experiment conducted and the information desired. Also, other objective responses could be monitored which would indicate flow profile shape, work expended during puffing and puff duration and these objective responses could be correlated with more extensive subjective sensory attribute ratings. These and other variations in the sensory evaluation technique disclosed will be apparent to those skilled in the art and any such variations are deemed to fall within the scope of the appended claims.

What is claimed is:

1. A method for effecting sensory evaluation of a smoking product by a sensory evaluation panelist as the smoking product is being smoked ad libitum by the panelist, said method comprising the steps of
   (a) monitoring selected smoking parameters by sensing means placed in communication with a mouthpiece through which smoke from the smoking product is drawn into the mouth of the sensory evaluation panelist,
   (b) communicating a sequence of instructions and prompts to the sensory evaluation panelist as the smoking product is being smoked by the panelist,
   (c) coordinating the sequence of instructions and prompts to the sensory evaluation panelist with the ad libitum smoking process as monitored by said sensing means and
   (d) receiving a sensory evaluation rating from the sensory evaluation panelist in response to the sequence of instructions and prompts communicated to the panelist.

2. The method of claim 1 wherein the smoking parameters monitored include frequency of puffs taken by the panelist.

3. The method of claim 2 wherein a plurality of sensory evaluation ratings are received from the panelist at intervals during the smoking process.

4. The method of claim 3 wherein the intervals at which the sensory evaluation ratings are received are determined at least in part by the smoking parameters being monitored by the sensing means.

5. The method of claim 3 wherein the smoking product is a cigarette.

6. The method of claim 1, 2, 3, 4 or 5 wherein the sequence of instructions and prompts is communicated to the sensory evaluation panelist by a computer and a monitor with display screen associated therewith.

7. The method of claim 6 wherein the sensory evaluation ratings received from the panelist are indicated by a bit pad with stylus, by moving a cursor on the display screen or by a stimulus brought into contact with or close proximity to a portion of the display screen.

8. A system for conducting sensory evaluation of a smoking product by a sensory evaluation panelist as the smoking product is being smoked ad libitum by the panelist, said system comprising (a) a mouthpiece having a first end adapted for contact with the lips of the sensory evaluation panelist and a second end opposite from said first end for holding the smoking product, said mouthpiece being designed to allow passage of smoke from the smoking product into the mouth of the panelist, (b) sensing means associated with said mouthpiece for monitoring selected smoking parameters and generating signals corresponding thereto as the smoking product is being smoked, (c) computer means and an associated monitor with display screen for processing the signals generated by said sensing means and for communicating a sequence of instructions and prompts to the sensory evaluation panelist, (d) a computer program for coordinating the sequence of instructions and prompts communicated to the sensory evaluation panelist with the ad libitum smoking process as determined by the selected smoking parameters being monitored by said sensing means and (e) means for receiving a sensory evaluation rating from the sensory evaluation panelist in response to the sequence of instructions and prompts communicated to the panelist.

9. The system of claim 8 wherein the sensing means detects changes in pressure or temperature.

10. The system of claim 8 wherein the means for receiving a sensory evaluation rating from the panelist comprises a bit pad with stylus, means for moving a cursor on the display screen or a touch-sensitive display screen that is responsive to activating means brought into contact with or close proximity to a portion of the display screen.

11. The system of claim 8, 9 or 10 wherein said mouthpiece is designed to hold a cigarette.

* * * * *